United States Patent [19]
Smith et al.

[11] Patent Number: 6,085,271
[45] Date of Patent: Jul. 4, 2000

[54] SYSTEM BUS ARBITRATOR FOR FACILITATING MULTIPLE TRANSACTIONS IN A COMPUTER SYSTEM

[75] Inventors: Donald W. Smith, Santa Clara; Jack H. Choquette, Los Altos; Mayank Gupta, Sunnyvale, all of Calif.

[73] Assignee: SandCraft, Inc., Santa Clara, Calif.

[21] Appl. No.: 09/059,615

[22] Filed: Apr. 13, 1998

[51] Int. Cl.[7] .................................................. G06F 13/00
[52] U.S. Cl. .......................................................... 710/113
[58] Field of Search ..................................... 710/113–125

[56] References Cited

U.S. PATENT DOCUMENTS

| | | | |
|---|---|---|---|
| 4,369,510 | 1/1983 | Johnson et al. | 714/49 |
| 4,620,278 | 10/1986 | Ellsworth et al. | 710/119 |
| 5,127,089 | 6/1992 | Gay et al. | 710/108 |
| 5,325,535 | 6/1994 | Santeler et al. | 710/108 |
| 5,377,331 | 12/1994 | Drerup et al. | 710/113 |
| 5,459,840 | 10/1995 | Isfeld et al. | 710/129 |
| 5,506,971 | 4/1996 | Gullette et al. | 710/116 |
| 5,526,494 | 6/1996 | Iino et al. | 710/119 |
| 5,581,782 | 12/1996 | Sarangdhar et al. | 710/119 |
| 5,590,299 | 12/1996 | Bennett | 711/5 |
| 5,594,882 | 1/1997 | Bell | 711/212 |
| 5,603,007 | 2/1997 | Yazdy et al. | 711/140 |
| 5,619,661 | 4/1997 | Crews et al. | 710/119 |
| 5,668,975 | 9/1997 | Coddington | 711/169 |
| 5,787,095 | 7/1998 | Myers et al. | 714/820 |
| 5,787,264 | 7/1998 | Christiansen et al. | 710/113 |
| 5,799,160 | 8/1998 | Woodbridge et al. | 710/113 |
| 5,826,045 | 10/1998 | Reams | 710/107 |
| 5,862,353 | 1/1999 | Revilla et al. | 395/287 |
| 5,867,675 | 2/1999 | Lomelino et al. | 710/129 |
| 5,898,857 | 4/1999 | Beaman et al. | 395/500.44 |

*Primary Examiner*—Paul R. Myers
*Attorney, Agent, or Firm*—Blakely, Sokoloff, Taylor & Zafman

[57] ABSTRACT

A method and an apparatus using, in one embodiment, a multiple split mode for issuing multiple read or write requests that may be used during a data transaction within a computer system. In one embodiment, a processing unit comprises a bus arbitrator having bus control lines for controlling a bus, which transmits address and data information. The arbitrator is capable of issuing multiple consecutive read or write requests including at least one read request on the bus without releasing control by the processing unit over the bus during the consecutive read or write requests. In addition, the arbitrator is also designed to abort consecutive read requests during address cycles in response to bus control lines.

31 Claims, 8 Drawing Sheets

FIG. 2 (PRIOR ART) WRITE

MULTIPLE SPLIT READ #1

MULTIPLE SPLIT READ w/2 READ SPLIT BY 1 WRITE

SYSTEM BUS ARBITRATOR FOR FACILITATING MULTIPLE TRANSACTIONS IN A COMPUTER SYSTEM

BACKGROUND OF THE INVENTION

1. Field of the Invention

The present invention relates to the field of computer system architecture and in particular, to data transactions using multiple operations which may be interrupted in such architecture.

2. Description Information

With recent emerging technologies, such as the Internet, digital telecommunications, speech processing, sound processing, electronic facsimile and image processing, high performance computer systems and printers are required to process such voluminous data in order to produce adequate results within reasonable response time. Even though faster semiconductors, such as faster CPUs and memory chips, may solve part of the performance problem, compatibility of system architectures between existing systems and a new system is another important consideration because users are reluctant to purchase new software every time they purchase new hardware or vice versa. Thus, increasing system's performance by optimizing an existing architecture often produces more desirable results.

A computer system generally includes a processing unit, memory, I/O interface, and busing arrangements. Each component connects to a system bus or several buses to transfer data between the components. Since a bus can typically only transfer one source data at any given time, bus contention between the components often becomes a major factor of how fast a system can run. Consequently, a more sophisticated busing arrangement for arbitrating the use of buses is quite necessary to have a high performance computer system.

Busing arrangements include some means of bus arbitration that facilitates the sequence of data to be transferred. Such means for arbitrating is usually performed by a bus arbitrator. For example, when a processing unit desires to write data to some other destination component, it signals to the bus arbitrator, which is typically a separate component from the processing unit, that the data is ready and provides an address to which the data is to be written. If multiple system components want to be master of a bus for transferring data, the bus arbitrator prioritizes the data to be transferred and decides which component gets the bus first. Data transfer between system components is normally accomplished by read and write transactions.

FIG. 1 illustrates typical read requests issued by a processing unit on a system address and data ("SysAD") bus 106. In one particular example, a SysAD bus is a bus architecture which interfaces a MIPs R4000 or R5000 series compatible microprocessor from MIPs of Mountain view, Calif., with memory and other components. The processing unit initially samples a read ready signal ("RdRdy") 102 to determine whether an external agent is ready to accept a read request. When the RdRdy 102 is asserted, it indicates that the external agent is ready to accept a read request. In cycle 3, the processing unit issues a first read request, read0 124, on a system command ("SysCmd") bus 108 and addr0 126 on SysAD bus 106. During cycle 3, the processing unit also asserts data valid out ("ValidOut") 109 indicating the data on the buses are valid. The processing unit during cycle 3 also releases mastership of SysAD bus 106 by asserting a release signal ("Release") 104. In a typical SysAD bus architecture, a Release 104 is automatically asserted by the processor during a read request which is accepted. Thus, a read response will follow the read request. The processing unit waits for read response 134 in cycle 4 and receives data0, which is the response of read0, in cycle 5. During cycle 5, the external agent also asserts a valid data in signal ("ValidIn") 107 indicating that the data from the external agent on the SysAD 106 is valid. The external agent further deasserts the RdRdy 102 during cycle (indicating it is not ready to accept a read request) and then in cycle 6 the external agent asserts RdRdy 102 to indicate that it is ready to accept another read request. Two cycles after the assertion of RdRdy, a next read request, read1 136, is issued. As can be seen, there are at least four cycles between the first and second read requests. It will be appreciated that in a typical embodiment, many of the actions which occur in a clock cycle occur at a clock edge, such as a rising edge.

FIG. 2 illustrates a typical busing arrangement for a write request. The processor unit initially samples a write ready signal ("WrRdy") 202 from an external agent to determine whether the external agent is ready to accept a write request. After WrRdy 202 is asserted for two cycles 222, the processor unit in cycle 3 acknowledges that the external agent is ready to accept a write request. In cycle 3, the processing unit issues a first write request, write0 224, on SysCmd bus 108 and addr0 226 on SysAD bus 106. Also, ValidOut 109 is asserted to indicate that the valid data is on the buses. The busing protocol requires at least two unused cycles 232 after a write address and data pair in order to resample WrRdy 202. Moreover, in a possible write mode, an external agent suspends subsequent writes for four system cycles after WrRdy 202 is deactivated. As can be seen, the number of cycles between first and second issuances of write requests can be four system cycles 230, but it may easily take six or more system cycles 240. In a variation of the write request protocols, it has been possible to perform pipelined write requests, such as multiple consecutive write requests, and to reissue a write request which is aborted. However, these protocols do not support multiple consecutive read requests without release of bus mastership between the read requests.

A busing arrangement having an address and data pair every four system cycles is not sufficiently high performance for modern computer systems. It is desirable to have a busing arrangement that can arbitrate buses more efficiently. As will be seen, one embodiment of the present invention provides protocol options that allow an address and data pair at a rate of every two cycles.

SUMMARY OF THE INVENTION

The present invention provides a system for issuing multiple read requests from a processor which arbitrates a bus using a multiple split read mode without releasing bus mastership between consecutive request address cycles.

In one embodiment, a processing unit contains a bus arbitrator that is coupled to bus control lines for controlling mastership on a bus. The bus is designed to transmit address and data information between components of a computer system. The bus arbitrator is capable of issuing multiple consecutive read requests on buses without releasing mastership by the processing unit of the bus during consecutive read request cycles and is also capable of aborting read requests during an address cycle in response to bus control lines.

In another embodiment, a bus arrangement is designed to facilitate multiple consecutive read transactions on an address and data bus using a multiple split read mode with the capability to abort read requests during address cycles.

In this mode, multiple consecutive read instructions (or at least one read instruction followed consecutively by a write instruction) may be issued from a processing unit, which contains the bus arbitrator for controlling bus mastership, before releasing the bus from mastership by the processing unit. The bus arbitrator is configured to abort the issued read requests during the address cycle.

BRIEF DESCRIPTION OF THE DRAWINGS

The present invention is illustrated by way of example and not limitation in the accompanying figures.

DETAILED DESCRIPTION

A method and an apparatus for issuing multiple consecutive read or write requests on an address and data bus is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, a processing unit is designed to include a bus arbitrator. The arbitrator is configured to have a plurality of bus control lines for controlling buses, which transmit address and data information between system components. The arbitrator is capable of issuing multiple consecutive read or write requests on the buses and it can also abort read or write requests during address cycles. The processing unit may be a microprocessor formed on a single semiconductor substrate to create an integrated circuit.

In another embodiment, a bus arrangement is designed to facilitate multiple consecutive read or write transactions using multiple split mode on an address and data bus with the capability to interrupt the issued read or write requests.

Figure 1:
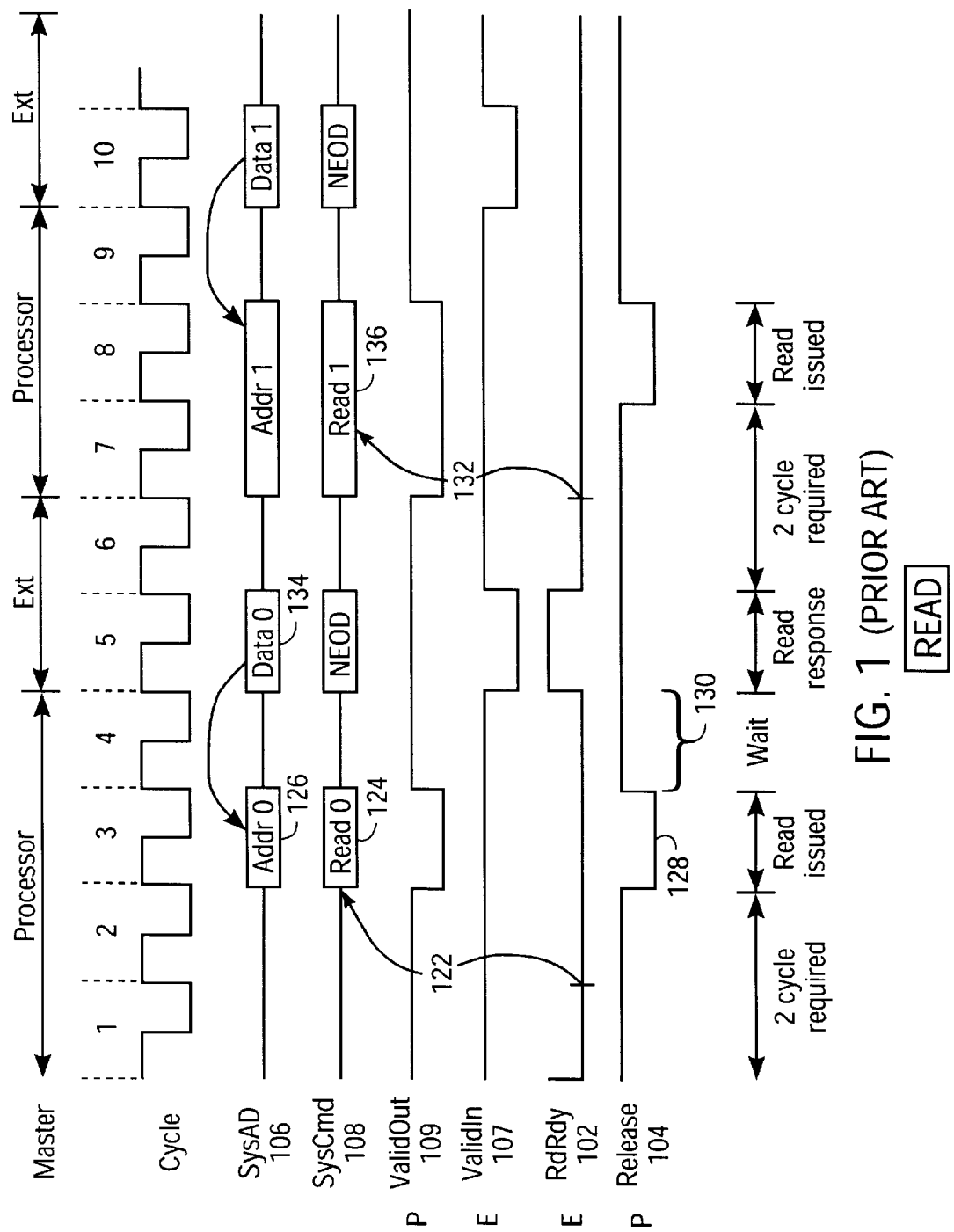
FIG. 1 illustrates typical processor read requests.
Figure 2:
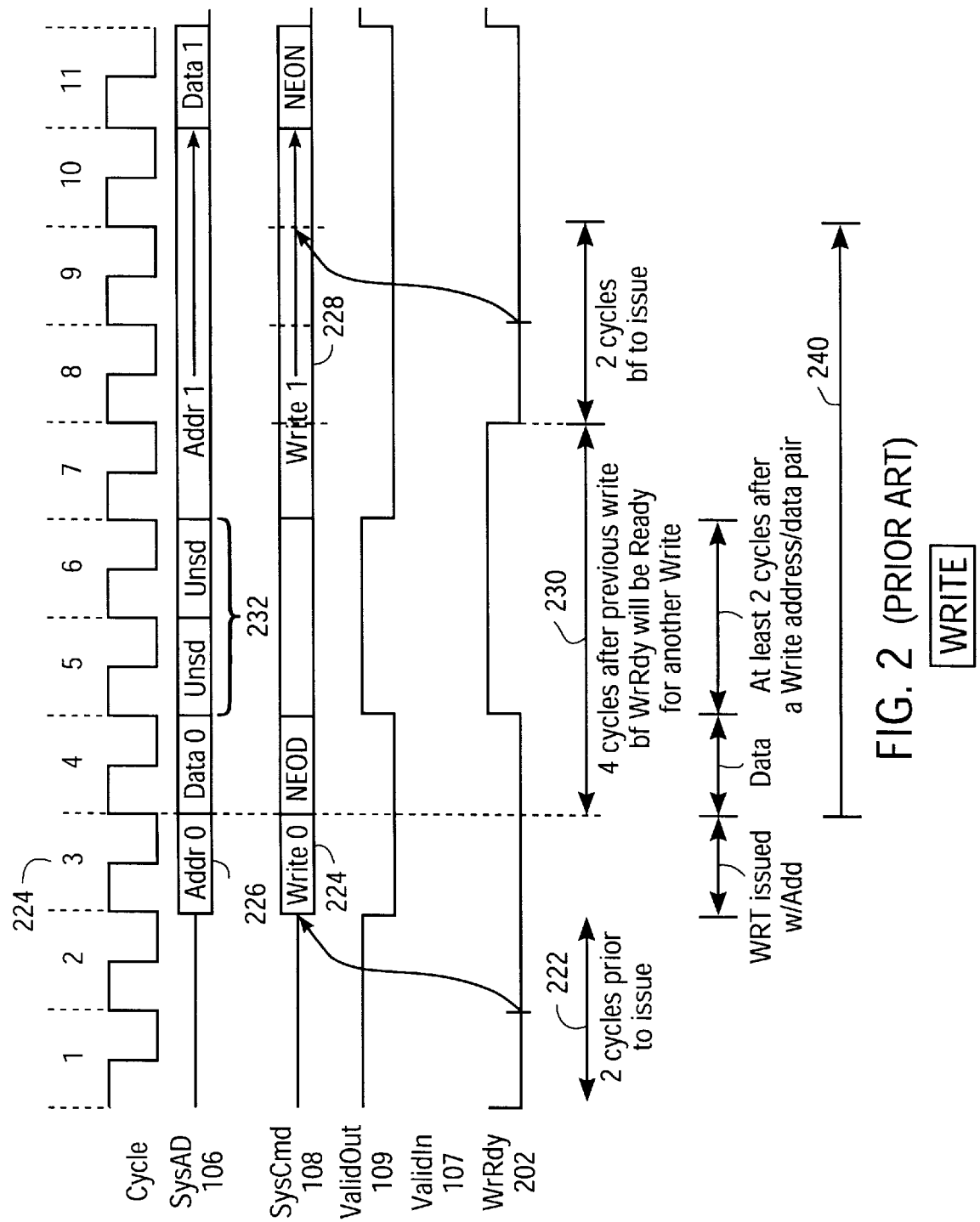
FIG. 2 illustrates typical processor write requests.
Figure 3:
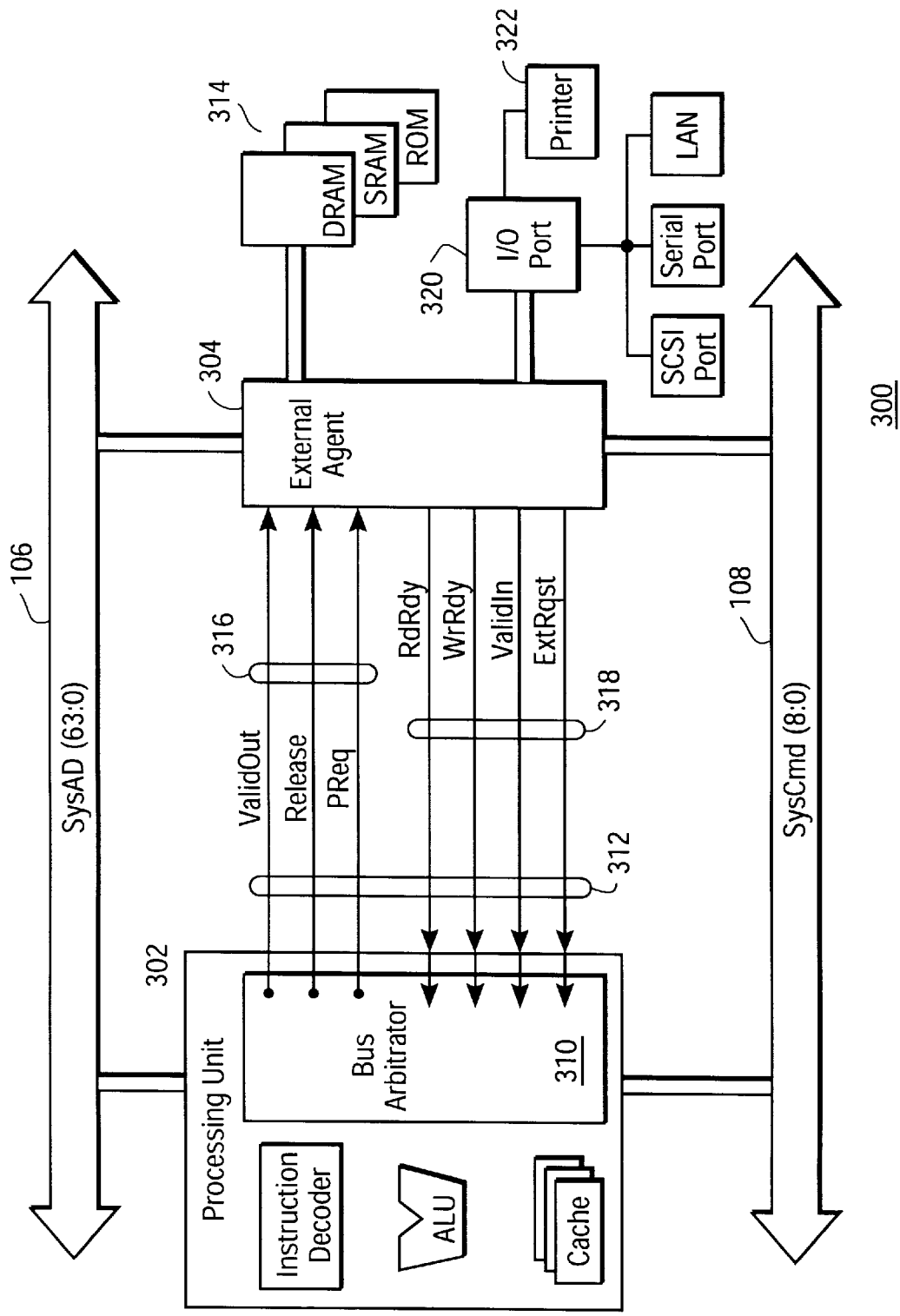
FIG. 3 illustrates a system with a bus interface in accordance with the present invention.

FIG. 3 illustrates a computer system 300 configured in accordance with one embodiment of the present invention. The system 300 includes a processing unit 302, external agent 304, a set of control lines 312, a SysAD bus 106, and SysCmd bus 108. The buses 106 and 108 may be considered together to form one bus. Both the processing unit 302 and external agent 304 are coupled to SysAD bus 106 and SysCmd bus 108. The control lines 312 are used to determine whether the processing unit 302 or external agent 304 should be the master of the buses.

The processing unit 302 further contains a bus arbitrator 310. The arbitrator 310 is configured to grant mastership of the buses in response to signals transmitted by the control lines 312 and in response to internal states of the processing unit 302. The control lines 312 transmit uni-directional control signals and they are further divided into two sub-sets of control lines, 316 and 318. The arbitrator 310 receives one sub-set of control lines 318 as inputs and provides another sub-set of control lines 316 as outputs.

A scheme of handshaking using the control lines 312 is used by the arbitrator 310 to arbitrate the mastership of the buses. Control lines RdRdy 102 and WrRdy 202 are used by the external agent 304 to indicate when it can accept next read or write requests respectively. Control lines ExtRqst and Release 104 are used to transfer mastership of the SysAD 106 and SysCmd 108 buses. The ExtRqst is used by an external agent 304 to indicate a need to control the interface (and in effect becomes a bus master). Release 104 may be asserted by the processing unit 302 when it releases the mastership of the buses to the external agent 304. The processing unit 302 uses ValidOut 109 to indicate that the data from the processing unit 302 is valid on the buses. Similarly, the external agent 304 uses ValidIn 107 to indicate the data from the external agent 304 is valid on the SysCmd 108 or SysAD 106 buses. Thus, it can be seen that processing unit 302 controls arbitration of the bus by receiving signals from external agents and by providing signals indicating release of bus mastership.

The SysAD 106 is designed to transmit address information during address cycles and to transmit data during data cycles. The SysCmd 108 bus is used to indicate whether the cycle is an address or data cycle and to identify origin of the data in a data cycle and to provide system commands in the address cycle. The external agent 304 is also coupled to memory 314, I/O port 320, and a printer 322. The memory 314 may include DRAM, SRAM, and ROM and the I/O ports 320 may further connect to a SCSI port, a serial port, and a LAN interface. It will be appreciated that many different computer architectures exist and that FIG. 3 shows only one of the many different architectures. It will be understood, for example, that the external agent may be a memory controller and an I/O (input/output) controller which controls DRAM memory and which controls an I/O port; the I/O port may receive data from the serial port and provide the data to memory (through a DMA operation) and may provide data to the printer 322 (or another display device such as a CRT or liquid crystal display device) from memory or the processor. The processing unit 302 may be a microprocessor, which includes ALU, instruction decoder, and may also include on-chip caches.

Figure 4:
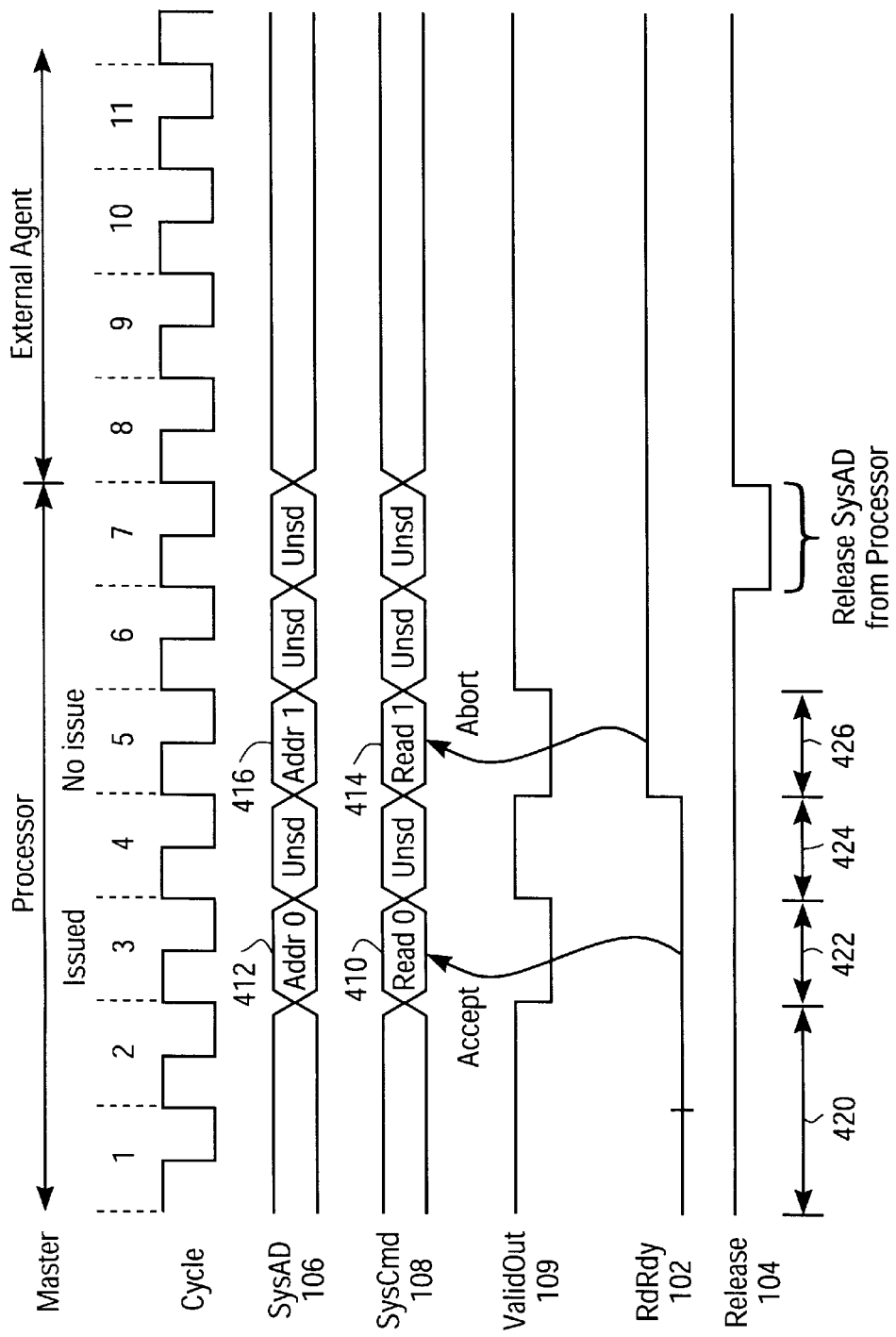
FIG. 4 illustrates a multiple split read timing diagram in accordance with the present invention.

FIG. 4 illustrates a multiple split read protocol timing diagram 400 with read0 410 issued and read1 414 aborted. The external agent 304 asserts RdRdy 102 for two cycles from cycle 1 to cycle 2, which indicates that the external agent 304 is ready to accept a read request. In cycle 3, the processing unit issues read0 410 on SysCmd bus 108 and addr0 412, which points to where the data is to be read from, on SysAD bus 106. The processing unit 302 also asserts ValidOut 109 in the same cycle to indicate the data on SysCmd bus 108 and SysAD bus 106 is valid and the data is issued by the processing unit 302. The active state of RdRdy 102 in cycle 3 indicates that the read0 410 request has been accepted. Since RdRdy 102 is active in cycle 3 and 4, it indicates that the external agent 304 may be ready to accept a next read request. Without releasing the mastership of the buses, the processing unit 302 issues another read request, read1 414, in cycle 5. However, the RdRdy 102 is deasserted during the cycle of addr1 416 indicating that the read1 414 is aborted or interrupted. It should be recognized that the function of abortion is similar to the function of interruption. The aborted or interrupted read request will be reissued in later cycles. At cycle 7, the processing unit 302 asserts Release 104 to release the mastership of the buses to the external agent when the resources are not available for the processing unit 302 to do another read transaction. After releasing the bus to the external agent, the read response to read0 410 is provided to the processing unit 302. It should be apparent that read requests may be issued only if the RdRdy 102 is asserted for two cycles prior to the address cycle and the RdRdy 102 is also asserted during the address cycle.

The processing unit 302 will continue to issue read or write transactions without asserting Release 104 until a condition occurs. The processing unit 302 asserts the Release 104 in response to one of the following conditions in one particular embodiment of the invention. First, the processing unit 302 does not have any more transactions to issue and there is at least one outstanding read request. Second, the resources required to perform data transactions are not available to the processing unit 302 (e.g., as indicated by RdRdy 102 or WrRdy 202 being asserted) and there is at least one outstanding read request or the ExtRqst is asserted. Third, the external agent 304 asserts the ExtRqst and the processing unit 302 is at a transaction set boundary. Fourth, read requests are outstanding that are waiting to be executed and a set of write requests has just been completed. Fifth, the processing unit 302 has reached the maximum (e.g., four) number of outstanding read requests that can be queued. It will be understood that the addresses in the consecutive requests are not necessarily consecutive addresses and may be addresses for different, non-contiguous memory regions or even addresses to different external devices.

Figure 5:
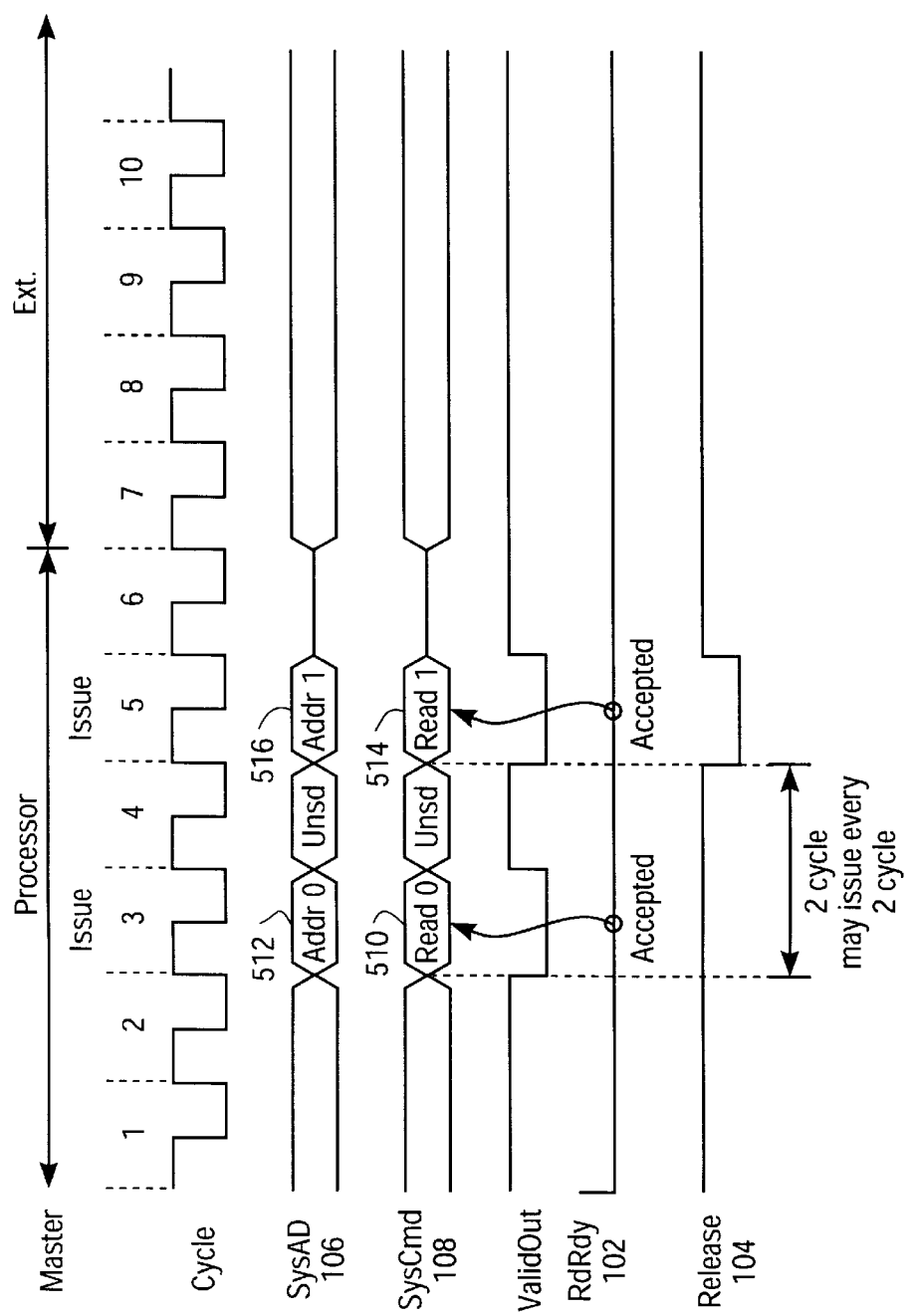
FIG. 5 illustrates a multiple split read timing diagram with two read requests in accordance with the teachings of the present invention.

FIG. 5 illustrates a multiple split read protocol timing diagram 500 with two read requests issued. The external agent 304 asserts RdRdy 102 for two cycles from cycle 1 to cycle 2 indicating that the external agent 304 is ready to accept a read request. In cycle 3, the processing unit issues read0 510 on SysCmd bus 108 and addr0 512, which points to where the data is to be read from, on the SysAD bus 106. The active state of RdRdy 102 in cycle 3 indicates that the read0 510 request has been accepted. Since the RdRdy 102 remains asserted in cycle 3 and 4, it further indicates that the external agent 304 is ready to accept a next read request. Without releasing the mastership of the buses, the processing unit 302 issues another read request, read1 514, in cycle 5. The active of state of RdRdy 102 in cycle 5 indicates that the read1 514 has been accepted by the external agent 304. During cycle 5, the processing unit 302 asserts Release 104 to pass the mastership of the buses from the processing unit 302 to the external agent 304. It should be noted that the Release 104 can be asserted independent from the states of RdRdy 102. In other words, the Release 104 can be asserted even if RdRdy 102 is deasserted in the same cycle. The diagram 500 illustrates a bus interface that is capable of issuing read requests at a rate of every two cycles where the processing unit controls the arbitration of the bus interface.

Figure 6:
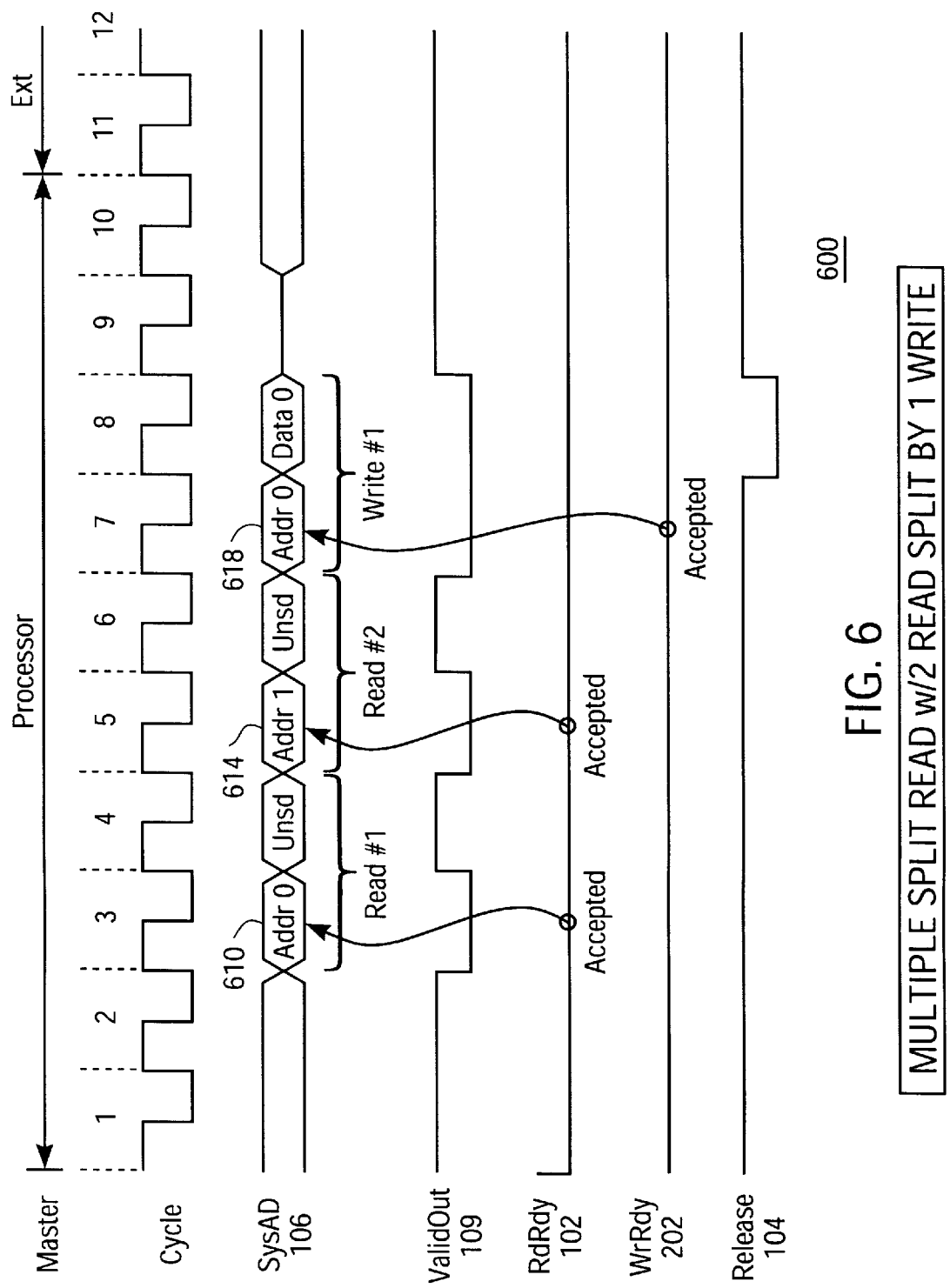
FIG. 6 illustrates a multiple split read timing diagram with two reads followed by a write in accordance with the present invention.

FIG. 6 illustrates a multiple split read protocol timing diagram 600 with two reads followed by one write. The external agent 304 asserts RdRdy 102 for two cycles from cycle 1 to cycle 2 indicating that the external agent 304 is ready to accept a read request. During cycle 3, the processing unit 302 issues a first read on SysCmd bus 108 and an addr0 612, which points to where the data is to be read from, on the SysAD bus 106. The processing unit 302 also asserts ValidOut 109 to indicate that the data on the SysAD bus 106 and the SysCmd bus 108 is valid. The external agent 304 asserts RdRdy 102 during cycle 3 indicating that the first read 610 has been accepted. Without releasing the bus mastership, the processing unit 302 then issues a second read request 614 in cycle 5 after detecting that the external agent 304 is ready to accept another read. The external agent 304 asserts RdRdy 102 in cycle 5 indicating that the second read 614 has been accepted. During cycle 7, the processing unit 302 issues a write request 618 after detecting that the external agent 304 is also ready to accept a write request since the WrRdy 202 has been. The processing unit 302 also asserts the ValidOut 109 to indicate that the data from the processing unit 302 on the SysAD bus 106 is valid. The external agent 304 asserts WrRdy 202 in cycle 7 indicating that the write request 618 has been accepted. During cycle 8, the processing unit 302 asserts the Release 104 to release the mastership of the buses so that the external agent 304 can respond the two issued read requests when it becomes bus master. Note that the response to the read requests have been interrupted or "split" by a write instruction which was issued after the two read requests but before the responses to the two read requests. In this manner, multiple reads have been "split" to provide an example of a multiple split read mode. In another example, a single read instruction may issue followed by a write instruction followed by a response to the read instruction. The timing diagram 600 shows that the processing units 302 issues two read cycles back-to-back followed by a block write cycle in multiple split read mode, which demonstrates that multiple transactions can be issued, but the order and type of transactions may be mixed.

Figure 7:
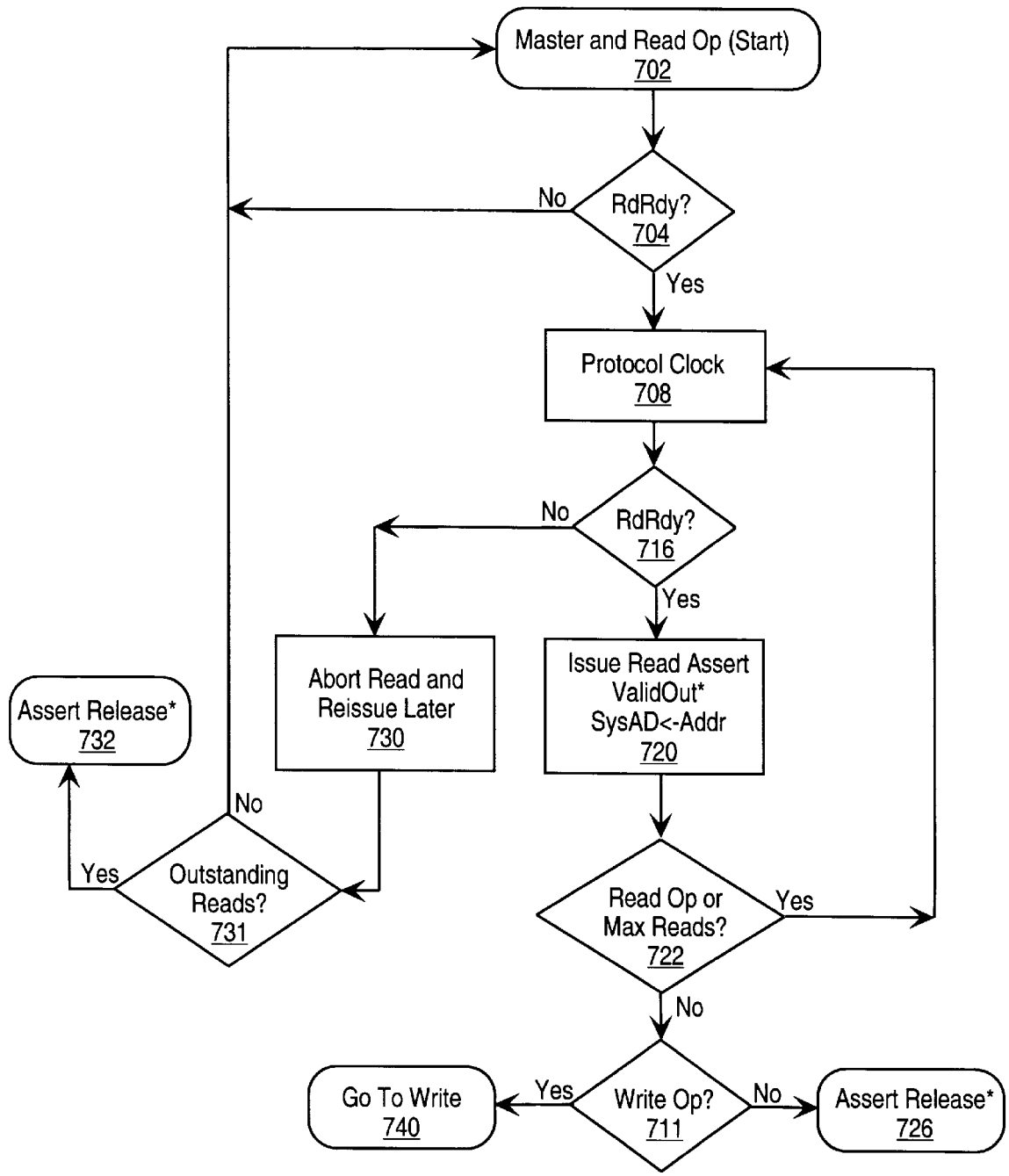
FIG. 7 is a flow chart of multiple split reads in accordance with the present invention.

FIG. 7 illustrates a flow chart of bus arbitration 700 for multiple split read mode. The flow chart 700 starts at block 702. The process of the flow chart may be implemented in a state machine which controls the arbitrator 310 in the processing unit 302. At cycle 1, the process of issuing read or write requests starts at block 702 and proceeds to block 704 to examine whether RdRdy 102 is asserted. If block 704 is false, which means RdRdy 102 is not asserted, the process loops back to block 702 and starts a new process. If block 704 is true, which indicates RdRdy 102 is active, the process proceeds to the next block 708. After a clock cycle at block 708, the process proceeds to block 716.

If block 716 is true, which indicates that the external agent 304 is ready to accept a read request, the process proceeds to the next block 720 to issue a read request. At block 720, the processing unit 302 issues a read request on SysCmd bus 108 and supplies an address, which indicates where the data is to be read from, on SysAD bus 106. In addition, ValidOut is asserted to indicate that there is valid information from the processing unit 302 on SysAD 106 and SysCmd 108 buses. After block 720, the process proceeds to block 722 to determine whether there are more read operations waiting to be issued (and the maximum number of outstanding reads has not been exceeded). If block 722 is true, which indicates that there is at least one read operation that is waiting to be issued, the process loops back to block 708 to process the next read operation. If block 722 is false, which indicates that there is no more read operation or the maximum number of read operations that can be issued consecutively has been reached, the process then proceeds to block 711 to check whether there are write operations pending to be issued. If block 711 is true, which means that there is at least one write operation pending, the process next goes to block 740 to perform the write operation. If the block 711 is false, the process proceeds to block 726, where the processing unit 302 releases its bus controls by asserting Release 104.

If block 716 is false, which means RdRdy 102 is not active and the external agent 304 is not accepting read requests, the process proceeds to the block 730 where the read operation is aborted or interrupted and the aborted or interrupted read operation will be reissued later. After block 730, the process proceeds to block 731 to determine whether there are outstanding Reads. If block 731 is false, which means there is no outstanding Read, the process loops back to block 702 and starts new process. If block 731 is true, which indicates that there is at least one outstanding Read, the process moves to the block 732 where the processing unit 302 releases its bus controls by asserting Release 104.

Figure 8:
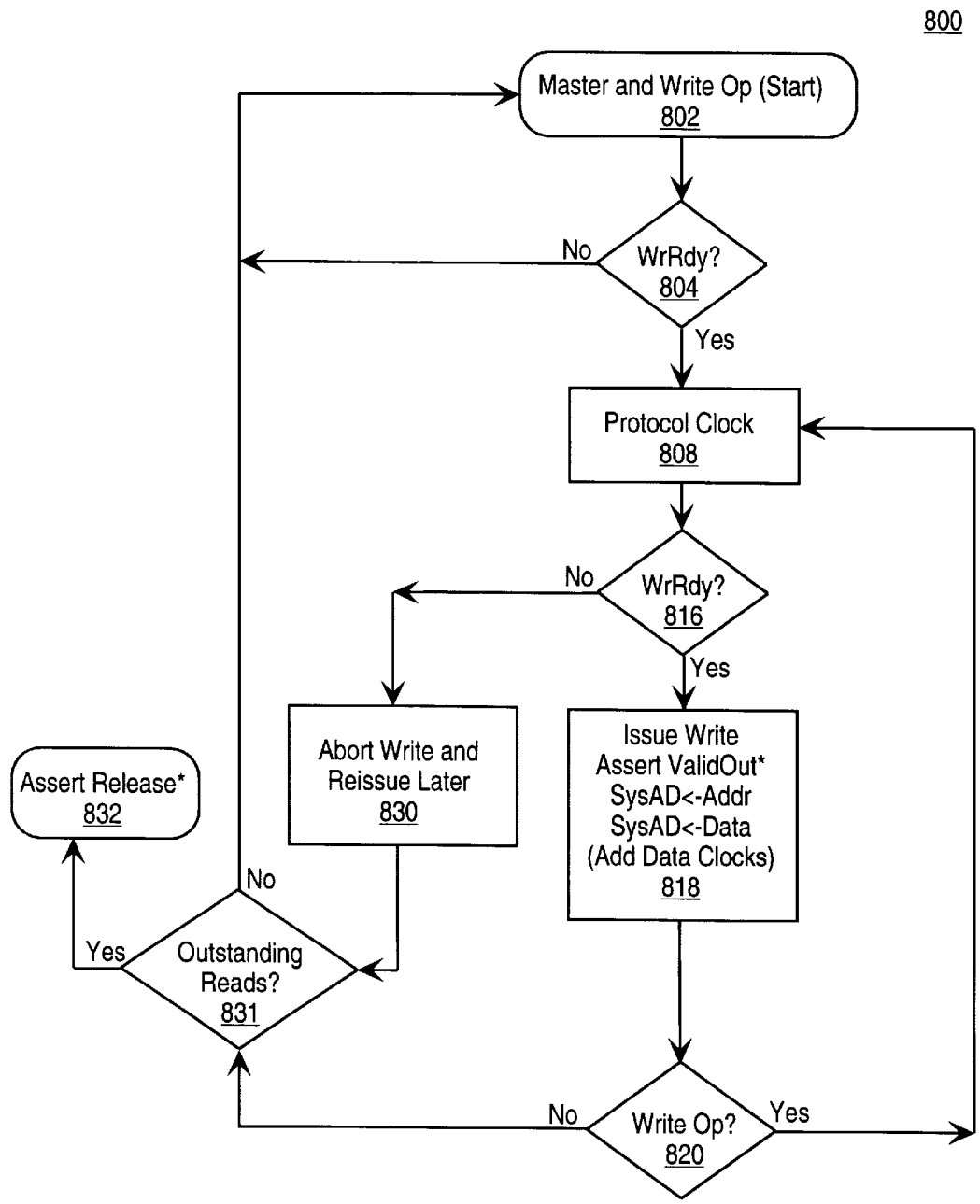
FIG. 8 is a flow chart of write portion of multiple split read mode in accordance with the present invention.

FIG. 8 illustrates a flow chart of bus arbitration 800 for the write portion of multiple split read mode. The flow chart 800 starts at block 802. During cycle 1, the process of issuing read or write requests starts at block 802 and proceeds to block 804 to examine whether WrRdy 202 is active. If block 804 is false, which indicates that WrRdy 202 is inactive, then the process loops back to block 802 and starts a new process. If block 804 is true, which means that WrRdy 202 is active, the process proceeds to the next block 808 in cycle 2.

At block 808, the process waits for a clock cycle and then proceeds to block 816.

If block 816 is true, which indicates that the external agent 304 is ready to accept a write request, the process proceeds to block 818. At block 818, the processing unit 302, first, asserts ValidOut 107 to signal that the processing unit 302 is using the buses. Next, while the processing unit 302 issues a write request on SysCmd bus 108, it also supplies an address, which indicates where the data is to be written to, on SysAD bus 106. Moreover, the processing unit 302 further supplies data to be written on SysAD bus 106 during subsequent data cycles. It should be noted that the data may take more than one data cycle to transfer. After block 818, the process proceeds to block 820 to check whether there are more write operations pending to be issued. If block 820 is true, which indicates that there is at least one write operation pending, the process loops back to block 808 to execute the next write operation. As can been seen, the processing unit 302 is capable of issuing additional write requests after the data cycle as long as other requirements are met. If block 820 is false, the process proceeds to block 831 to check whether there are outstanding Reads. If block 831 is false, the process loops back to the beginning of block 802 and starts a new process. If block 831 is true, which indicates that there is at least one outstanding Read, the process proceeds to block 832 where the processing unit 302 releases its bus controls by asserting Release 104.

If block 816 is false, the process proceeds to block 830 to abort or interrupt the write request and to reissue the aborted or interrupted write request at later cycles. Once the write request is aborted or interrupted, the process proceeds to block 831 to check whether there are outstanding Reads. If block 831 is false, the process loops back to the beginning of block 802 and starts a new process. If block 831 is true, which indicates that there is at least one outstanding Read, the process proceeds to block 832 where the processing unit 302 releases its bus controls by asserting Release 104.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A processing unit comprising a bus arbitrator having bus control lines for controlling mastership on a bus which transmits address and data information, said bus arbitrator configured to issue multiple consecutive read requests without releasing mastership of said bus during consecutive read request address cycles on said bus, wherein said multiple consecutive read requests can be issued at a rate of one request for every two said read request address cycles.

2. The processing unit of claim 1, wherein said bus arbitrator is configured to issue a read request consecutively followed by a write request without releasing mastership of said bus between said read request and said write request.

3. The processing unit of claim 1, wherein a read request is issued in response to a read ready signal ("RdRdy") received by said bus arbitrator, wherein said RdRdy indicates a device coupled to said bus is ready for a read operation.

4. The processing unit of claim 3, wherein said RdRdy is active for at least one clock cycle before issuing said read request.

5. The processing unit of claim 2, wherein said bus arbitrator is further configured to abort said read request during an address cycle in response to external signals from said bus control lines.

6. The processing unit of claim 3, wherein said bus control lines provide an acknowledgment of accepting said read request from an external device during said address cycle.

7. The processing unit of claim 2, wherein said write request is configured to be issued in response to a write ready signal ("WrRdy") received by said bus arbitrator, wherein said WrRdy indicates a device coupled to said bus is ready to receive data.

8. The processing unit of claim 7, wherein said WrRdy is active for at least one clock cycle before issuing a write request.

9. The processing unit of claim 7, wherein said bus arbitrator is further configured to abort said write request during said address cycle in response to external signals from said bus control lines.

10. The processing unit of claim 9, wherein said bus control lines provide an acknowledgment of accepting said write request from said device during said address cycle.

11. The processing unit of claim 2, wherein said read or write requests can be in any sequence of mixed read and write requests.

12. The processing unit of claim 1, wherein said bus control lines include a valid data out ("ValidOut"), said ValidOut indicating validity of data on said bus, and wherein said bus substantially complies with SysAD bus protocols.

13. The processing unit of claim 1, wherein said bus control lines further include a bus release signal ("Release"), said Release configured to release control of said bus from said processing unit when asserted.

14. The processing unit of claim 13, wherein said Release is configured to be asserted in response to completion of issuing said read or write requests and existence of at least one outstanding read request.

15. The processing unit of claim 14, wherein said Release is further configured to be asserted in response to busy signals from external devices and existence of at least one outstanding read request or an active state of an external request signal ("ExtRqst"), said ExtRqst configured to request use of said bus by an external device.

16. The processing unit of claim 15, wherein said Release is further configured to be asserted in response to an active state of said ExtRqst.

17. The processing unit of claim 16, wherein said Release is further configured to be asserted in response to existence of outstanding said read requests and completion of write requests.

18. The processing unit of claim 17, wherein said Release is further configured to be asserted in response to a maximum number of outstanding read requests.

19. The processing unit of claim 1, wherein said bus is compatible with MIPs R4000 and R5000 series SysAD bus based processors.

20. A method for controlling a bus by a processing unit having a bus arbitrator which controls mastership of said bus which transmits address and data information, said method comprising the steps of:

issuing multiple consecutive read or write requests including at least one read request on said bus before releasing control of said bus from said processing unit during said consecutive requests, wherein said requests are issued at a rate of one said request for every two clock cycles; and interrupting said read or write requests during address cycles in response to control signals on said bus.

21. The method of claim 20, wherein said steps of issuing read or write requests include the steps of:

receiving a read ready signal ("RdRdy") to facilitate issuance of subsequent said read requests;

receiving a write ready signal ("WrRdy") to facilitate issuance of subsequent said write requests; and receiving a bus release signal ("Release") to indicate completion of said read or write requests, said Release configured to be asserted independent from said RdRdy.

22. The method of claim 20 wherein said read requests or write requests can be in any sequence of mixed read and write requests and wherein addresses of said requests are to non-contiguous memory address locations.

23. The method of claim 21 including additional steps of asserting WrRdy for at least one clock cycle before issuing a write request.

24. The method of claim 20 wherein said steps of aborting include the steps of:

deasserting said RdRdy during said address cycle to abort said read request;

reissuing aborted read request in later clock cycles;

deasserting said WrRdy during said address cycle to abort said write request; and reissuing aborted write request in later clock cycles.

25. The method of claim 20 further comprising the steps of:

receiving a data valid out signal ("ValidOut") during said address cycle to indicate validity of data on said bus;

receiving said RdRdy during said address cycle to indicate acceptance of said read request by external devices; and receiving said WrRdy during said address cycle to indicate acceptance of said write request by said external devices.

26. The method of claim 21, wherein the steps of asserting Release further include one of the steps of:

completing issuance of read or write requests and existing of at least one outstanding read request;

deasserting said RdRdy or WrRdy and existing of at least one outstanding read request or asserting an external request ("ExtRqst");

asserting said ExtRqst and setting request boundaries;

completing a set of write requests and existing outstanding read requests;

reaching limits of outstanding read requests.

27. A system comprising:

a memory;

an address and data bus coupled to said memory;

a processing unit ("CPU") having a bus arbitrator coupled to said bus for issuing multiple consecutive read or write instructions including at least one read instruction on said bus before releasing control of said bus from said CPU to external devices coupled to said bus, said arbitrator further configured to abort said read or write instructions during address cycles in response to bus control signals on said bus, wherein said instructions are issued at a rate of one said instruction per every two address cycles.

28. The system of claim 27 wherein aborted read or write instructions are reissued in subsequent address cycles and wherein addresses of said requests are to non-contiguous memory address locations.

29. The system of claim 27, wherein said control signals further include a read ready signal ("RdRdy") which indicates an external device is ready for a read operation, said bus arbitrator being configured to abort said read instruction.

30. The system of claim 29, wherein said control signals further include a write ready signal ("WrRdy") which indicates an external device is ready for a write operation, said bus arbitrator being configured to abort said write instruction.

31. A processing unit comprising a bus arbitrator having bus control lines for controlling mastership on a bus which transmits address and data information, said bus arbitrator configured to issue multiple consecutive read requests without releasing mastership of said bus during consecutive read request address cycles on said bus, wherein said multiple consecutive read requests can be issued at a rate of at least one request for every two said read request address cycles.

* * * * *